US008887261B2

(12) United States Patent
Cooppan et al.

(10) Patent No.: US 8,887,261 B2
(45) Date of Patent: Nov. 11, 2014

(54) SYSTEM FOR AND METHOD OF AUTHENTICATING MEDIA MANAGER AND OBTAINING A DIGITAL TRANSMISSION CONTENT PROTECTION (DTCP) CERTIFICATE

(75) Inventors: Dayalan Cooppan, Natick, MA (US); Robin M. Mathews, Westford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 380 days.

(21) Appl. No.: 12/963,976

(22) Filed: Dec. 9, 2010

(65) Prior Publication Data

US 2012/0151570 A1    Jun. 14, 2012

(51) Int. Cl.
  G06F 21/00   (2013.01)
  H04N 21/8355  (2011.01)
  H04L 29/06   (2006.01)
  H04N 5/913   (2006.01)
  H04N 21/258   (2011.01)
  H04N 21/4627  (2011.01)
  H04N 21/475   (2011.01)

(52) U.S. Cl.
  CPC ........ H04N 21/8355 (2013.01); H04L 63/0823 (2013.01); H04N 5/913 (2013.01); H04N 21/25816 (2013.01); H04N 21/4627 (2013.01); H04N 21/4753 (2013.01); H04N 2005/91328 (2013.01); H04N 2005/91364 (2013.01)
  USPC .......................................................... 726/10

(58) Field of Classification Search
  CPC ............... H04L 63/0823; H04N 5/913; H04N 21/25816; H04N 21/4753
  USPC .......................................................... 726/10
  See application file for complete search history.

(56) References Cited

U.S. PATENT DOCUMENTS

| 2003/0009662 | A1* | 1/2003 | Gindin et al. | 713/156 |
| 2004/0243815 | A1* | 12/2004 | Tsukamura | 713/193 |
| 2010/0333213 | A1* | 12/2010 | Etchegoyen | 726/29 |
| 2011/0087881 | A1* | 4/2011 | Howcroft et al. | 713/156 |
| 2011/0093920 | A1* | 4/2011 | Etchegoyen | 726/3 |

* cited by examiner

*Primary Examiner* — Peter Shaw

(57) ABSTRACT

A system for and method of authenticating a media manager and obtaining DTCP certificates is presented. The system and method may include receiving a request for digital transmission content protection certificate provided by a user of a content provider, verifying user information associated with the user of the content provider, providing the request for digital transmission content protection certificate to a digital transmission content protection certificate system, and receiving a digital transmission content protection certificate.

22 Claims, 5 Drawing Sheets

SYSTEM FOR AND METHOD OF AUTHENTICATING MEDIA MANAGER AND OBTAINING A DIGITAL TRANSMISSION CONTENT PROTECTION (DTCP) CERTIFICATE

BACKGROUND INFORMATION

Digital Transmission Content Protection (DTCP) licenses content protection systems by distributing cipher keys and device certificates that offers protection satisfying the requirements of the content providers. DTCP is a standard aimed at embedding an authentication and encryption system within devices to prevent copyrighted or trademarked works from being pirated. For example, the DTCP would prohibit some programs from being copied, such as pay-per-view or paid cable programming. Typically, the authentication and encryption system are embedded within devices during the manufacturing process; however, in personal computer (PC) multimedia applications, there needs to be a robust method of obtaining authentication and encryption that meets the DTCP.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

An exemplary embodiment provides a system and a method for authenticating a media server and obtaining a DTCP certificate. For example, a media manager may be installed on or downloaded to a workstation associated with a user of a content provider. The media manager may be coupled to an authentication or activation system in order to authenticate itself. For example, the authentication or activation system may request authentication information from the user of the media manager. The authentication or activation system may verify the authentication information in order to authenticate the media manager.

The media manager may provide a DTCP certificate request to the authentication or activation system to obtain a DTCP certificate. The authentication or activation system may verify user information of the user of a content provider. The authentication or activation system may provide the DTCP certificate request to the DTCP certificate system. The DTCP certificate system may generate a DTCP certificate and provide the DTCP certificate to the authentication or activation system. Subsequently, the authentication or activation system may provide the DTCP certificate to the media manager in order for the media manager to access various contents stored at a set-top box (STB), digital video recorder (DVR) or consumer electronic device (CE).

Figure 1:
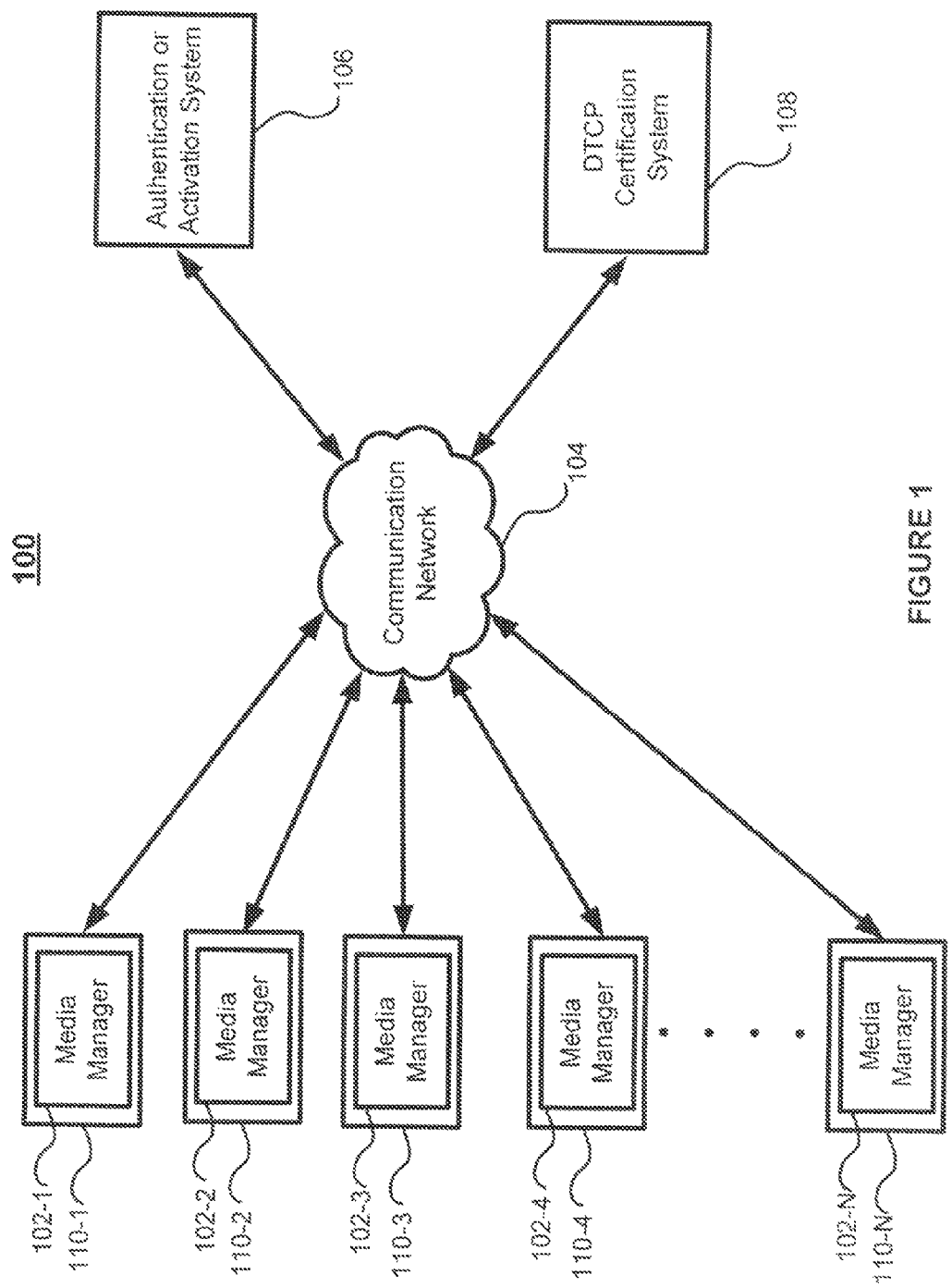
FIG. 1 is a schematic diagram illustrating a system authenticating media managers and obtaining DTCP certificate according to particular embodiments.

FIG. 1 is a schematic diagram illustrating a system authenticating media managers and obtaining DTCP certificate according to particular embodiments. As illustrated in FIG. 1, the system 100 for authenticating media managers and obtaining DTCP certificates may include a plurality of media managers 102(1-N) installed or downloaded to a plurality of workstations 110(1-N) associated with users of a content provider. The plurality of media manager 102(1-N) may be coupled to an authentication or activation system 106 via a communication network 104. The plurality of media managers 102(1-N) may be also coupled to a DTCP certificate system 108 via the communication network 104. The authentication or activation system 106 may be associated with a content provider that provides various contents to users of the content provider. In an exemplary embodiment, the DTCP certificate system 108 may be associated with the content provider that provides the various contents to users of the content provider. In another exemplary embodiment, the DTCP certificate system 108 may be associated with a third party entity that may issue the DTCP certificate.

The media manager 102 may provide an authentication request to the authentication or activation system 106. The authentication or activation system 106 may prompt for authentication information from the user of the media manager 102. The authentication or activation system 106 may determine whether to authenticate the media manager 102. In the event that the authentication or activation system 106 authenticates the media manager 102, the authentication or activation system 106 may provide an authentication acceptance to the media manager 102. The media manager 102 may generate an authentication fingerprint based at least in part on a unique feature of the workstation 110 of the user of the content provider. The media manager 102 may provide the authentication fingerprint to the authentication or activation system 106 and stored.

The media manager 102 may provide a DTCP certificate request to the authentication or activation system 106. The authentication or activation system 106 may provide the DTCP certificate request to the DTCP certificate system 108. The DTCP certificate system 108 may generate a DTCP certificate and provide the DTCP certificate to the authentication or activation system 106. The authentication or activation system 106 may provide the DTCP certificate to the media manager 102. The DTCP certificate may allow the workstation 110 of the user of the content provider to access various contents stored at a content provider device (e.g., set-top box (STB), digital video recorder (DVR), or consumer electronic device (CE)) provided by the content provider.

Content as used herein may refer to multimedia that uses, for example, one or more of text, audio, graphics, and video. For example, content may include television programs, on-demand programming, pay-per-views, and paid cable programming. The content may also include audio, video, music, interactive content, time-shifted content, photos, websites, banners, a webpage, recipes, instructions, advertisements, long advertisements (e.g., longer than the traditional 30 second spots used in television programs), text, interactive advertisements, Video on Demand (VoD) content, Video on Demand (VoD) advertising, user generated content, broadband content, advanced advertisements, over-the top content, additional content that the viewer selects to view, and/or combinations thereof.

The content providers may include one or more servers that provide various contents to users. The content providers may include, but not limited to, a radio company, a fiber optics company, a cable company (e.g., Cox Communication, Comcast Corp, and/or Adelphia Communication Corp), a satellite company (e.g., DirecTV and/or Dish Network), a broadcasting company (e.g., National Broadcasting Company (NBC), American Broadcasting Company (ABC), Fox Broadcasting Company (FOX), and/or Columbia Broadcasting System (CBS)) and/or other radio/television broadcasting companies. The content providers may also include, but not limited to, an Internet content providers. Moreover, the content providers may be over-the top content providers including Netflix®, Blockbuster®, or RedBox®.

The plurality of workstations 110(1-N) hosting the plurality of media mangers 102(1-N) may be a computer, a personal computer, a laptop, a cellular communication device, a workstation, a mobile device, a phone, a handheld PC, a personal digital assistant (PDA), a thin system, a fat system, a network appliance, a network device Tablets), an Internet browser, or other any other device that may be in communication with the authentication or activation server 106 via the communication network 104.

The communication network 104 may couple the plurality of workstations 110(1-N) to the authentication or activation servers 106 and the DTCP certificate system 108. The communication network 104 may be a wireless network, a wired network or any combination of wireless network and wired network. For example, the communication network 104 may include one or more of a fiber optics network, a passive optical network, a cable network, an Internet network, a satellite network (e.g., operating in Band C, Band Ku or Band Ka), a wireless LAN, a Global System for Mobile Communication (GSM), a Personal Communication Service (PCS), a Personal Area Network (PAN), D-AMPS, Wi-Fi, Fixed Wireless Data, IEEE 802.11a, 802.11b, 802.15.1, 802.11n and 802.11g or any other wired or wireless network for transmitting and receiving a data signal. In addition, the communication network 104 may include, without limitation, telephone line, fiber optics, IEEE Ethernet 802.3, wide area network (WAN), local area network (LAN), global network such as the Internet, or long term evolution (LTE) mobile network technology. The communication network 104 may support an Internet network, a wireless communication network, a cellular network, or the like, or any combination thereof.

The communication network 104 may further include one, or any number of the exemplary types of networks mentioned above operating as a stand-alone network or in cooperation with each other. The communication network 104 may include one, or any number of networks that may enable transmission of data via the transport layer security (TLS) protocol or the secure sockets layer (SSL) protocol. Although the communication network 104 is depicted as one network, it should be appreciated that according to one or more embodiments, the communication network 104 may comprise a plurality of interconnected networks, such as, for example, a service provider network, the Internet, a broadcaster's network, a cable television network, corporate networks, and home networks.

The authentication or activation system 106 may include one or more servers. For example, the authentication or activation system 106 may include a UNIX based server, Windows 2000 Server, Microsoft ITS server, Apache HTTP server, API server, Java sever, Java Servlet API server, ASP server, PHP server, HTTP server, Mac OS X server, Oracle server, IP server, LINUX server, or other independent server to authenticate or activate a plurality of media managers 102(1-N) and obtain DTCP certificates. Also, the authentication or activation system 106 may include one or more Internet Protocol (IP) network server or public switch telephone network (PSTN) server. The authentication or activation system 106 may provide DTCP certificate to the plurality of workstations 110(1-N) hosting the plurality of media managers 102(1-N) via the communication network 104.

The authentication or activation system 106 may include one or more storage devices including, without limitation, paper card storage, punched card, tape storage, paper tape, magnetic tape, disk storage, gramophone record, floppy disk, hard disk, ZIP disk, holographic, molecular memory. The one or more storage devices may also include, without limitation, optical disc, CD-ROM, CD-R, CD-RW, DVD, DVD-R, DVD-RW, DVD+R, DVD+RW, DVD-RAM, Blu-ray, Minidisc, HVD and Phase-change Dual storage device. The one or more storage devices may further include, without limitation, magnetic bubble memory, magnetic drum, core memory, core rope memory, thin film memory, twistor memory, flash memory, memory card, semiconductor memory, solid state semiconductor memory or any other like mobile storage devices.

The DTCP certificate system 108 may include one or more servers to issue DTCP certificates to the plurality of workstations 110(1-N) hosting the plurality of media managers 102 (1-N) via the authentication or activation system 106 and the communication network 104. For example, the DTCP certificate system 108 may include a UNIX based server, Windows 2000 Server, Microsoft ITS server, Apache HTTP server, API server, Java sever, Java Servlet API server, ASP server, PHP server, HTTP server, Mac OS X server, Oracle server, IP server, or other independent server to provide DTCP certificate to the plurality of workstations 110 (1-N) hosting the plurality of media managers 102(1-N). Also, the DTCP certificate system 108 may include one or more Internet Protocol (IP) network server or public switch telephone network (PSTN) server.

The DTCP certificate system 108 may include one or more storage devices including, without limitation, paper card storage, punched card, tape storage, paper tape, magnetic tape, disk storage, gramophone record, floppy disk, hard disk, ZIP disk, holographic, molecular memory. The one or more storage devices may also include, without limitation, optical disc, CD-ROM, CD-R, CD-RW, DVD, DVD-R, DVD-RW, DVD+R, DVD+RW, DVD-RAM. Blu-ray, Minidisc, HVD and Phase-change Dual storage device. The one or more storage devices may further include, without limitation, magnetic bubble memory, magnetic drum, core memory, core rope memory, thin film memory, twistor memory, flash memory, memory card, semiconductor memory, solid state semiconductor memory or any other like mobile storage devices.

Figure 2:
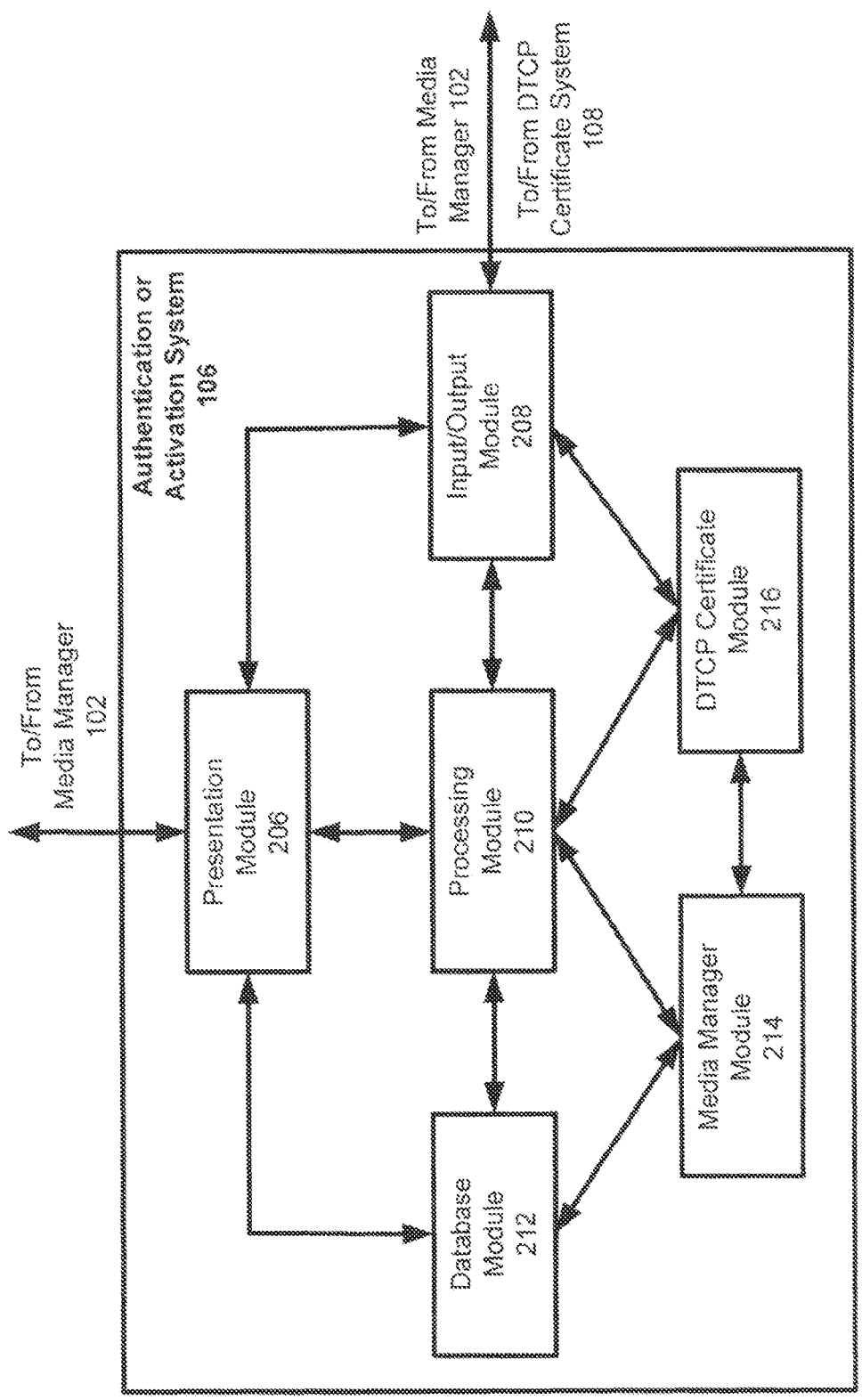
FIG. 2 is a block diagram of a hardware component of the authentication or activation system according to a particular embodiment.

FIG. 2 is a block diagram of a hardware component of the authentication or activation system according to a particular embodiment. The authentication or activation system 106 may include a presentation module 206, an input/output (I/O) module 208, a processing module 210, a database module 212, a media manager module 214, or a DTCP certificate module 216. It is noted that the modules 206, 208, 210, 212, 214, and 216 are exemplary and the functions performed by one or more of the modules may be combined with that performed by other modules. The functions described herein as being performed by the modules 206, 208, 210, 212, 214, and 216 also may be separated and may be located or performed by other modules. Moreover, the modules 206, 208, 210, 212, 214, and 216 may be implemented at other devices of the system 100 for authenticating media managers and obtaining DTCP certificates (e.g., the communication network 104, the plurality of workstations 110(1-N), and the DTCP certificate system 108).

The presentation module 206 may provide an interface between users of the media manager 102 and the authentication or activation system 106. The presentation module 206 may include a user interface, e.g., a graphical user interface, to receive one or more queries/requests from the user of the media manger 102. The presentation module 206 may provide a separate or a unified graphical user interface. The presentation module 206 may include an Application Programming Interface (API) to interact with the user of the media manager 102. In an exemplary embodiment, the presentation module 206 may present one or more input requests or displays to the user of the media manager 102. For example, the presentation module 206 may provide input requests to the user of the media manner 102 for authentication information. In an exemplary embodiment, an authentication token may be provided to a user of the media manager 102 via an interactive voice system (e.g., customer service or automated voice system) of the content provider. In another exemplary embodiment, the authentication token may be provided to a user of the media manager 102 via an online registration process of the content provider.

The presentation module 206 may receive authentication information (e.g., authentication token) from a user of the media manager 102. In response to receiving the authentication token from a user of the media manager 102, the presentation module 206 may provide the authentication token to the input/output (I/O) module 208, the processing module 210, the database module 212, the media manger module 214, and the DTCP certificate module 216. For example, the presentation module 206 may provide the authentication token to the processing module 210 to verify the authentication token. The processing module 210 may access the media manager module 214 that may store content provider issued authentication tokens. The processing module 210 may verify whether the authentication token received by the presentation module 206 matches a content provider issued authentication token stored in the media manager module 214. The presentation module 206 may also provide the authentication token to the media manager module 214 and stored.

The presentation module 206 may receive one or more queries/requests from the user of the media manager 102 to obtain DTCP certificates in order to access various contents stored at the content provider device (e.g., set-top box (STB), digital video recorder (DVR), or consumer electronic device (CE)). For example, a user may utilize the media manager 102 to input a request to the presentation module 206 in order to obtain or activate a DTCP certificate for the workstation 110. In an exemplary embodiment, a user may input one or more queries/requests to obtain or activate a DTCP certificate for the workstation 110 in order to access contents stored on a content provider device (e.g., set-top box (STB), digital video recorder (DVR), or consumer electronic device (CE)) provided by the content provider. In another exemplary embodiment, a user may input one or more queries/requests to obtain or activate a DTCP certificate for the workstation 110 in order to access contents provided directly by the content providers.

The input/output (I/O) module 208 may include routers, repeater, antennas, or other transceiver device for transmitting data to and receiving data from the plurality of media managers 102(1-N) or the DTCP certificate system 108. For example, the input/output (I/O) module 208 may receive data provided by the plurality of media managers 102(1-N). The input/output (I/O) module 208 may establish a communication link with the plurality of workstations 110(1-N) and receive data provided by the plurality of media managers 102(1-N). The input/output (I/O) module 208 may receive authentication information (e.g., authentication token or authentication fingerprint) from the plurality of media managers 102(1-N) via the communication network 104. In another exemplary embodiment, the input/output (I/O) module 208 may receive data from the DTCP certificate system 108. The input/output (I/O) module 208 may establish a communication link with the DTCP certificate system 108 and receive data provided by the DTCP certificate system 108. For example, the input/output module 208 may receive DTCP certificate from the DTCP certificate system 108.

The input/output (I/O) module 208 may preprocess the data received from the plurality of media manger 102(1-N) or the DTCP certificate system 1.08 (e.g., filter, sort, format, and aggregate). In an exemplary embodiment, the preprocessing of the data received by the input/output (I/O) module 208 may include filtering the data and eliminating erroneous or defective data, sorting the data, formatting the data into desired format (e.g., identify various portions of the data), and aggregating the data from the plurality of media managers 102(1-N) or the DTCP certificate system 108.

The data may be transferred from the input/output (I/O) module 208 to the processing module 210 for processing. The processing module 210 may include a processor or a plurality of sub-analytical modules having a processor to perform various operations in order to authenticate and provide a DTCP certificate to the media manager 102 in order to allow the workstation 110 to access various contents stored at the content provider device (e.g., set-top box (STB), digital video recorder (DVR), or consumer electronic device (CE)). For example, the processing module 210 may receive authentication information (e.g., an authentication token) from a user of the media manager 102 via the presentation module 206. The processing module 210 may access the media manager module 214 that may store the content provider issued authentication tokens. The processing module 210 may verify whether the authentication token received by the presentation module 206 matches a content provider issued authentication token stored in the media manager module 214. The processing module 210 may determine that the authentication token provided by the user associated with the media manager 102 matches a content provider issued authentication token stored in the media manager module 214. The processing module 210 may provide an authentication acceptance to the media manager 102 via the input/output (I/O) module 208. In another exemplary embodiment, the processing module 210 may determine that the authentication token provided by the user of the media manager 102 does not match a content provider issued authentication token stored in the media manager module 214. The processing module 210 may request that the user of the media manager 102 to input another authentication token for a predetermined number of times (e.g., 3 times).

The processing module 210 may receive a DTCP certificate request from the user of the media manager 102 via the presentation module 206. The processing module 210 may verify whether the user of the media manager 102 qualifies for a DTCP certificate. For example, the processing module 210 may determine an identity of the user of the media manager 102 based at least in part on the DTCP certificate request. The processing module 210 may access the database module 212 to obtain user information associated with the user of the media manager 102. For example, the user information associated with the user of the media manager 102 may include, name, address, account number, telephone number, email address, billing information, set-top boxes (STB) information (e.g., a serial number or an identification number), digital video recorder (DVR) information (e.g., serial number or an identification number), consumer electronic device (CE) information (e.g., serial number or an identification number), cables, modems, routers, or other content provider devices associated with the user of the media manager 102. The processing module 210 may determine whether the user of the media manger 102 qualifies for the DTCP certificate based at least in part on the user information associated with the user of the media manager 102. In an exemplary embodiment, the processing module 210 may determine that the user of the media manager 102 has a content provider device (e.g., set-top box (STB), digital video recorder (DVR), or consumer electronic device (CE)) and may need a DTCP certificate in order to access various contents stored in the content provider device (e.g., set-top box (STB), digital video recorder (DVR), or consumer electronic device (CE)). In another exemplary embodiment, the processing module 210 may determine that the user of the media manager 102 does not have a content provider device (e.g., set-top box (STB), digital video recorder (DVR), or consumer electronic device (CE)) and may not need a DTCP certificate.

The processing module 210 may generate a DTCP certificate request for the media manager 102. For example, the processing module 210 may receive a DTCP certificate request provided by the media manager 102 via the input/output (I/O) module 208. The processing module 210 may determine that the media manager 102 qualifies for the DTCP certificate, the processing module 210 may generate a DTCP certificate request for the DTCP certificate system 108 based at least in part on the DTCP certificate request provided by the media manager 102. The DTCP certificate request may include user information of the user of the media manager 102 and information associated with various contents provided by the content provider. Information associated with the various contents may include content identification information, content schedule information, or other information associated with various contents. The processing module 210 may provide the DTCP certificate request to the DTCP certificate system 108 via the input/output (I/O) module 208.

The processing module 210 may provide an activation acceptance to a content provider device (e.g., set-top box (STB), digital video recorder (DVR), or consumer electronic device (CE)) associated with the user of the media manager 102. In an exemplary embodiment, the processing module 210 may generate an activation acceptance signal to the content provider device (e.g., set-top box (STB), digital video recorder (DVR), or consumer electronic device (CE)) in order to activate content sharing features of the content provider device. In another exemplary embodiment, the media manger 102 may provide a DTCP certificate to the content provider device (e.g., set-top box (STB), digital video recorder (DVR), or consumer electronic device (CE)), the content provider device may provide the DTCP certificate to the processing module 210 via the input/output (I/O) module 208. The processing module 210 may verify whether the DTCP certificate provided by the content provider device matches a DTCP certificate stored in the DTCP certificate module 216. In the event that the DTCP certificate provided by the content provider device matches a DTCP certificate stored in the DTCP certificate module 216, the processing module 210 may generate an activation acceptance to the content provider device to enable content sharing features of the content provider device. In the event that the DTCP certificate provided by the content provider device does not match a DTCP certificate stored in the DTCP certificate module 216, the process module 210 may generate an activation denial to the content provider device to disable the content sharing features of the content provider device.

In an exemplary embodiment, the processing module 210 may periodically update the DTCP certificates. For example, the DTCP certificate may be revoked after a predetermined period of time and the processing module 210 may automatically renew the DTCP certificate every minute, hour, day, week, month, a year, or other predetermined time periods. In another exemplary embodiment, the processing module 210 may renew the DTCP certificate based at least in part on a DTCP certificate renewal request provided by the media manager 102. For example, the processing module 210 may receive DTCP certificate renewal request having updated data from the media manager 102 and may renew the DTCP certificate based at least in part on the updated data.

The processing module 210 may generate authentication tokens issued to the user of the media manager 102. The authentication tokens may be valid for a predetermined period of time. The media manager module 214 may provide an expiration notification to the processing module 210, after the authentication token issued to the media manager 102 expires. The processing module 210 may generate new authentication tokens to replace the expired authentication tokens. The processing module 210 may also generate new authentication tokens for new users of the media manager 102. For example, the processing module 210 may generate new authentication tokens for new users of the media manager 102 based at least in part on the new user's account information. The processing module 210 may provide the newly generated authentication tokens to the media manger module 214 and stored.

The database module 212 may store and manage information of the users of the plurality of media managers 102(1-N). The database module 212 may provide an interface, e.g., a uniform interface, for other modules within the authentication or activation system 106 and may write, read, and search data stored in one or more repositories or databases. The database module 212 may also perform other functions, such as, but not limited to, concurrent access, backup and archive functions. Due to limited amount of storing space the database module 212 may compress, store, transfer or discard data stored within, after a period of time, e.g., a year. The database module 212 may provide information associated with a user of the plurality of media managers 102(1-N) to the processing module 210. For example, the database module 212 may receive data requests from the processing module 210 and provide information associated with the users of the plurality of media managers 102(1-N) to the processing module 210.

The database module 212 may be network accessible storage and may be local, remote, or a combination thereof to modules 206, 208, 210, 214, and/or 216. The database module 212 may utilize a redundant array of inexpensive disks (RAID), tape, disk, a storage area network (SAN), an internet small computer systems interface (iSCSI) SAN, a Fibre Channel SAN, a common Internet File System (CIFS), network attached storage (NAS), a network file system (NFS), or other computer accessible storage. In one or more embodiments, database module 212 may be a database, such as an Oracle® database, a Microsoft® SQL Server database, a DB2 database, a MySQL® database, a Sybase® database, an object oriented database, a hierarchical database, or other database. The database module 212 may utilize flat file structures for storage of data.

The media manager module 214 may store information associated with the plurality of media managers 102(1-N).

For example, the media manager module 214 may store address information (e.g., IP address, uniform resource identifiers (URIs), uniform resource locators (URLs), private electronic mail addresses, physical address, telephone number, or other address information) associated with the plurality of Media manager 102(1-N). The media manager module 214 may store an authentication token issued to the users of the plurality of media managers 102(1-N). The media manager module 214 may store an authentication fingerprint of the plurality of workstations 110 (1-N) hosting the plurality of media managers 102(1-N). The media manager module 214 may format the address information, authentication token, and authentication fingerprint of the plurality of workstations 110(1-N) into desired format. In an exemplary embodiment, the desired format for storing the address information, authentication token, or authentication fingerprint associated with the plurality of workstations 110(1-N) may include tables, hash tables, search trees, matrix, spread sheets, models, array structure, linear representation, or other representations of the directory of information. The media manager module 214 may include one or more databases to store a directory or list of address information, authentication token, and authentication fingerprint associated with the plurality of workstations 110(1-N).

The media manager module 214 may monitor the validity of the authentication tokens. For example, the authentication tokens may be valid for a predetermined period of time. The media manager module 214 may track the date when the authentication tokens are generated and may determined the date when the authentication tokens are expired after a predetermined period of time. Upon expiration of the authentication tokens, the media manager module 214 may provide an expiration notification to the processing module 210. The processing module 210 may renew the authentication token based at least in part on the expiration notification. In another exemplary embodiment, the media manager 214 may allow the expired authentication tokens to lapse after a predetermined period of time.

The DTCP certificate module 216 may include database to store DTCP certificates provided to the plurality of workstations 110(1-N) hosting the plurality of media managers 102 (1-N). In an exemplary embodiment, the DTCP certificate system 108 may provide the DTCP certificate to the DTCP certificate module 216 via the input/output (I/O) module 208 and stored. The DTCP certificate module 216 may monitor a validity of the DTCP certificates. For example, the DTCP certificate module 216 may track the validity duration of DTCP certificates. When a DTCP certificate is revoked after a predetermined period of time, the DTCP certificate module 216 may provide a DTCP certificate renewal request to the processing module 210 to be processed. The processing module 210 may provide the DTCP certificate renewal request to the DTCP certificate system 108 via the input/output (I/O) module 208 to renew the expired DTCP certificate.

Figure 3:
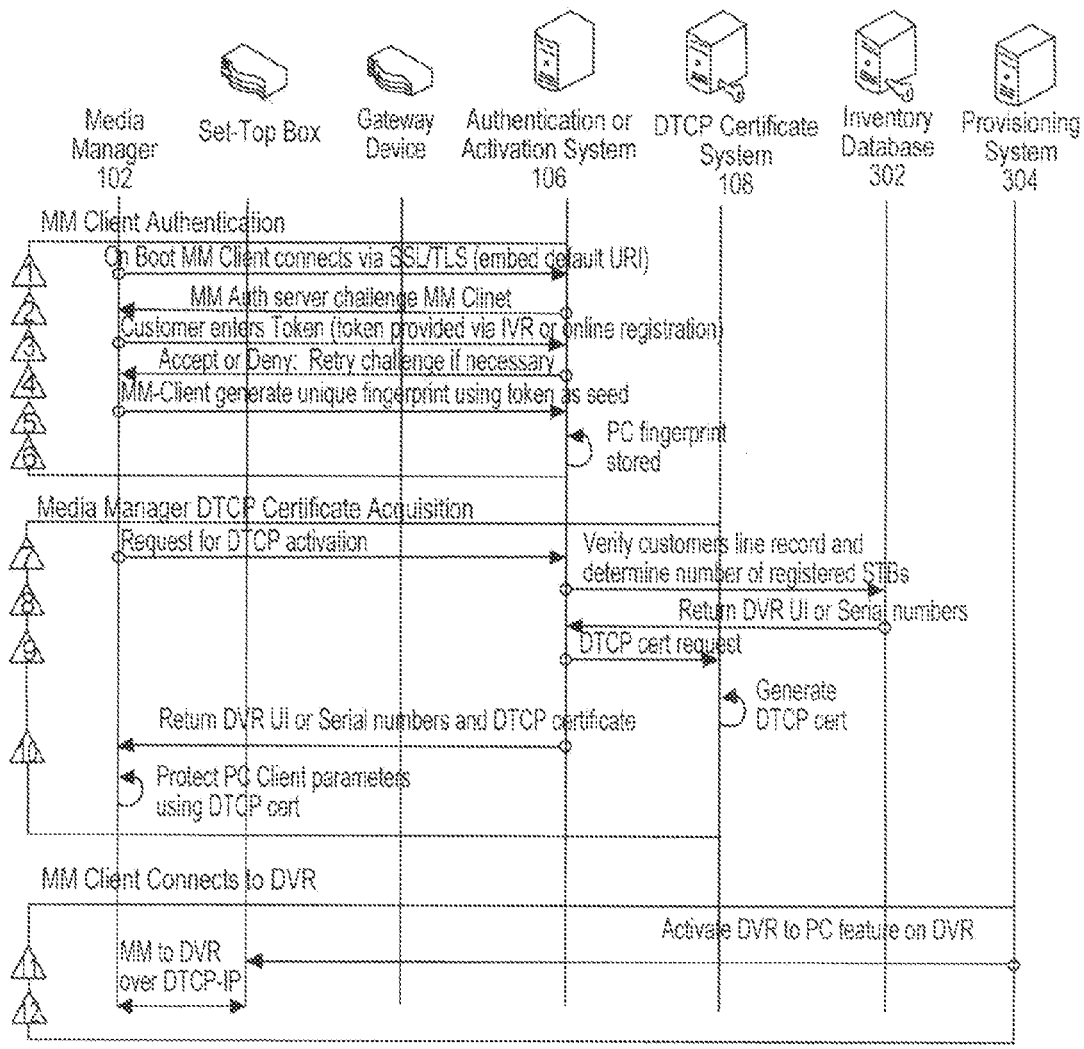
FIG. 3 is a flowchart illustrating the interaction of various components of a system for authenticating a media manager according to a particular embodiment.

FIG. 3 is a flowchart illustrating the interaction of various components of a system for authenticating a media manager according to a particular embodiment. This exemplary method 300 may be provided by way of example, as there are a variety of ways to carry out the method. The method 300 shown in FIG. 3 can be executed or otherwise performed by one or a combination of various systems. The method 300 is described below may be carried out by the system and network shown in FIGS. 1 and 2, by way of example, and various elements of the system and network are referenced in explaining the example method of FIG. 3. Each step shown in FIG. 3 represents one or more processes, methods or subroutines carried out in exemplary method 300.

At step one, a media manager 102 may start up. The media manager 102 may be coupled to the authentication or activation system 106 via the communication network 104. In an exemplary embodiment, the media manager 102 may be installed on a workstation 110 associated with a user of the media manager 102. The media manager 102 may include a default address (e.g., uniform resource locator (URL) or uniform resource identifier (URI)) in order to couple the media manger 102 to the authentication or activation system 106. Upon activation of the media manager 102, the media manager 102 may be coupled to the authentication or activation system 106 via the default address. The media manager 102 may be coupled to the authentication or activation system 106 via a transport layer security (TLS) protocol or secure sockets layer (SSL) protocol.

At step two, the authentication or activation system 106 may prompt input from the user of the media manager 102. For example, the authentication or activation system 106 may present a graphical user interface (GUI) to the user of the media manager 102. The graphical user interface (GUI) may allow the user of the media manager 102 to input requested information by the authentication or activation system 106. For example, the authentication or activation system 106 may prompt the user of the media manager 102 to input an authentication token via the graphical user interface (GUI).

At step three, the user of the media manager 102 may input authentication information prompted by the authentication or activation system 106. For example, the user of the media manger 102 may input authentication token via the workstation 110. The authentication token may be provided to the user of the media manager 102 via telephone (e.g., interactive voice recognition system, customer service), text messages, emails, fax, or other forms of communication. The authentication token (e.g., an alpha-numerical stream) may be generated based at least in part on account information associated with service provided by a content provider to the user of the media manager 102. The authentication token may be valid for a predetermined period of time controlled by the authentication or activation system 106. For example, the authentication or activation system 106 may invalid the authentication token after a predetermined period of time if the authentication token is not activated.

At step four, the authentication or activation system 106 may verify the authentication token provided by the user of the media manner 102. The authentication or activation system 106 may verify whether the authentication token provided by the user of the media manager 102 matches an issued authentication token. In an exemplary embodiment, the authentication or activation system 106 may determine that the authentication token provided by the user of the media manager 102 matches an issued authentication token. The authentication or activation system 106 may provide an authentication acceptance to the media manager 102. In another exemplary embodiment, the authentication or activation system 106 may determine that the authentication token provided by the user of the media manager 102 does not match an issued authentication token. The authentication or activation system 106 may request that the user of the media manager 102 to input another authentication token for a predetermined number of times (e.g., 3 times).

At step five, upon receiving authentication acceptance from the authentication or activation system 106, the media manager 102 may generate an authentication fingerprint and provide the authentication fingerprint to the authentication or activation system 106. For example, the authentication fingerprint may be generated based at least in part on the workstation of the media manager 102. For example, the authentication fingerprint may be generated based at least in part on an image, a microprocessor chip serial number, a media access control (MAC) address, operating system serial number, a seed, a unique randomized number, or a combination of unique features of the workstation of the media manager 102. Also, the authentication fingerprint may be generated based least in part on address information (e.g., IP address, uniform resource identifiers (URIs), uniform resource locators (URLs), private electronic mail addresses, physical address, telephone number, or other address information) of the workstation of the media manager 102.

At step six, the media manager 102 may provide the authentication fingerprint to the authentication or activation system 106. The authentication or activation system 106 may store the authentication fingerprint in order to identify the media manager 102. The authentication or activation system 106 may also store the authentication fingerprint in order to track a number of authentication fingerprints associated with the user of the media manager 102.

At step seven, the media manager 102 may provide a request for DTCP certificate to the authentication or activation system 106. For example, the request for DTCP certificate may include the authentication fingerprint of the media manager 102. The media manager 102 may transmit the request for DTCP certificate to the authentication or activation system 106 via a transport layer security (TLS) protocol or secure sockets layer (SSL) protocol.

At step eight, the authentication or activation system 106 may retrieve information associated with the user of the media manager 102 based at least in part on the request for the DTCP certificate. For example, the information associated with the user of the media manager 102 may include may include, name, address, account number, telephone number, email address, billing information, a set-top boxes (STB) (e.g., a serial number or an identification number), digital video recorder (DVR) (e.g., serial number or an identification number), consumer electronic device (CE) (e.g., serial number or an identification number), cable modem, router, or other equipments associated with the user of the media manager 102. In an exemplary embodiment, the authentication or activation system 106 may retrieve information associated with the user of the media manager 102 from an inventor database 302. The inventory database 302 may store information associated with the user of the media manager 102 that are stored in the database module 212.

The authentication or activation system 106 may determine whether the user qualifies for the DTCP certificate based at least in part on the information associated with the user of the media manager 102. In an exemplary embodiment, the authentication or activation system 106 may determine that the user of the media manager 102 has a digital video recorder (DVR) and may need a DTCP certificate in order to access various contents stored in the digital video recorder (DVR). In another exemplary embodiment, the authentication or activation 106 may determine that the user of the media manager 102 does not have a digital video recorder (DVR) and may not need a DTCP certificate to access contents stored in the digital video recorder (DVR).

At step nine, the authentication or activation system 106 may provide a DTCP certificate request to the DTCP certificate system 108. In an exemplary embodiment, the DTCP certificate system 108 may be associated with a content provider. In another exemplary embodiment, the DTCP certificate system 108 may be associated with a third party DTCP certificate provider (e.g., Digital Transmission Licensing Administrator (DTLA)). Upon receiving the DTCP certificate request, the DTCP certificate system 108 may generate a DTCP certificate based at least in part on the DTCP certificate request.

At step ten, the DTCP certificate system 108 may provide the DTCP certificate to the authentication or activation system 106. The authentication or activation system 106 may store the DTCP certificate. The authentication or activation system 106 may also provide the DTCP certificate to the media manager 102. The authentication or activation system 106 may provide information associated with user of the media manager 102 to the media manager 102 along with the DTCP certificate. For example, the authentication or activation system 106 may provide set-top boxes (STB) information (e.g., a serial number or an identification number), digital video recorder (DVR) information (e.g., serial number or an identification number), or consumer electronic device (CE) information (e.g., serial number or an identification number) to the media manager 102 along with the DTCP certificate. The authentication or activation system 106 may encrypt the DTCP certificate and the information associated with the user of the media manager 102 in order to prevent tempering or unauthorized access of the DTCP certificate and the information associated with the user of the media manager 102. In another exemplary embodiment, a DTCP certificate may be provided based at least in pail on the ability of the requesting device (e.g., workstation 110 or authentication or activation system 106) to securely store the DTCP certificate based on the authentication fingerprint.

At step eleven, the content provider may activate various features of a set-top box (STB) associated with the user of the media manager 102. For example, the content provider may activate a communication link between the set-top box (STB), the digital video recorder (DVR), or the consumer electronic device (CE) and the media manager 102. The communication link may allow the media manager 102 to access various contents stored on the set-top box (STB), the digital video recorder (DVR), or the consumer electronic device (CE). In an exemplary embodiment, a provisioning system 304 associated with the content provider may activate a communication link between the set-top box (STB), the digital video recorder (DVR), or the consumer electronic device (CE) and the media manager 102. In another exemplary embodiment, the authentication or activation system 106 may activate a communication link between the set-top box (STB), the digital video recorder (DVR), or the consumer electronic device (CE) and the media manager 102.

At step twelve, the media manager 102 may access various contents stores on the set-top box (STB), the digital video recorder (DVR), or the consumer electronic device (CE) via the DTCP certificate. In an exemplary embodiment, a DTCP certificate may be pre-installed onto the set-top box (STB), the digital video recorder (DVR), the consumer electronic device (CE). The media manager 102 and the set-top box (STB), the digital video recorder (DVR), or the consumer electronic device (CE) may exchange DTCP certificates held by each other. For example, the media manager 102 may provide the issued DTCP certificate to the set-top box (STB), the digital video recorder (DVR), the consumer electronic device (CE). The set-top box (STB), the digital video recorder (DVR), or the consumer electronic device (CE) may provide the pre-installed DTCP certificate to the media manager 102.

When the media manager 102 and the set-top box (STB), digital video recorder (DVR), or the consumer electronic device (CE) exchange DTCP certificates, a certificate of shared pathway may be established between the media manager 102 and the set-top box (STB), the digital video recorder (DVR), or the consumer electronic device (CE). The data exchanged between the media manager 102 and the set-top box (STB), the digital video recorder (DVR), or the consumer electronic device (CE) may be encrypted based at least in part on the exchanged DTCP certificates. The media manager 102 and the set-top box (STB), the digital video recorder (DVR), or the consumer electronic device (CE) may decrypt data exchanged between the media manager 102 and the set-top box (STB), the digital video recorder (DVR), or the consumer electronic device (CE) via the exchanged DTCP certificates. The DTCP certificate issued to the media manager 102 may be valid for a predetermined period of time (e.g., 15 days). The DTCP certificate issued to the media manager 102 may be controllable by the authentication or activation system 106. For example, the authentication or activation system 106 may revoke the DTCP certificate issued to the media manager 102.

Figure 4:
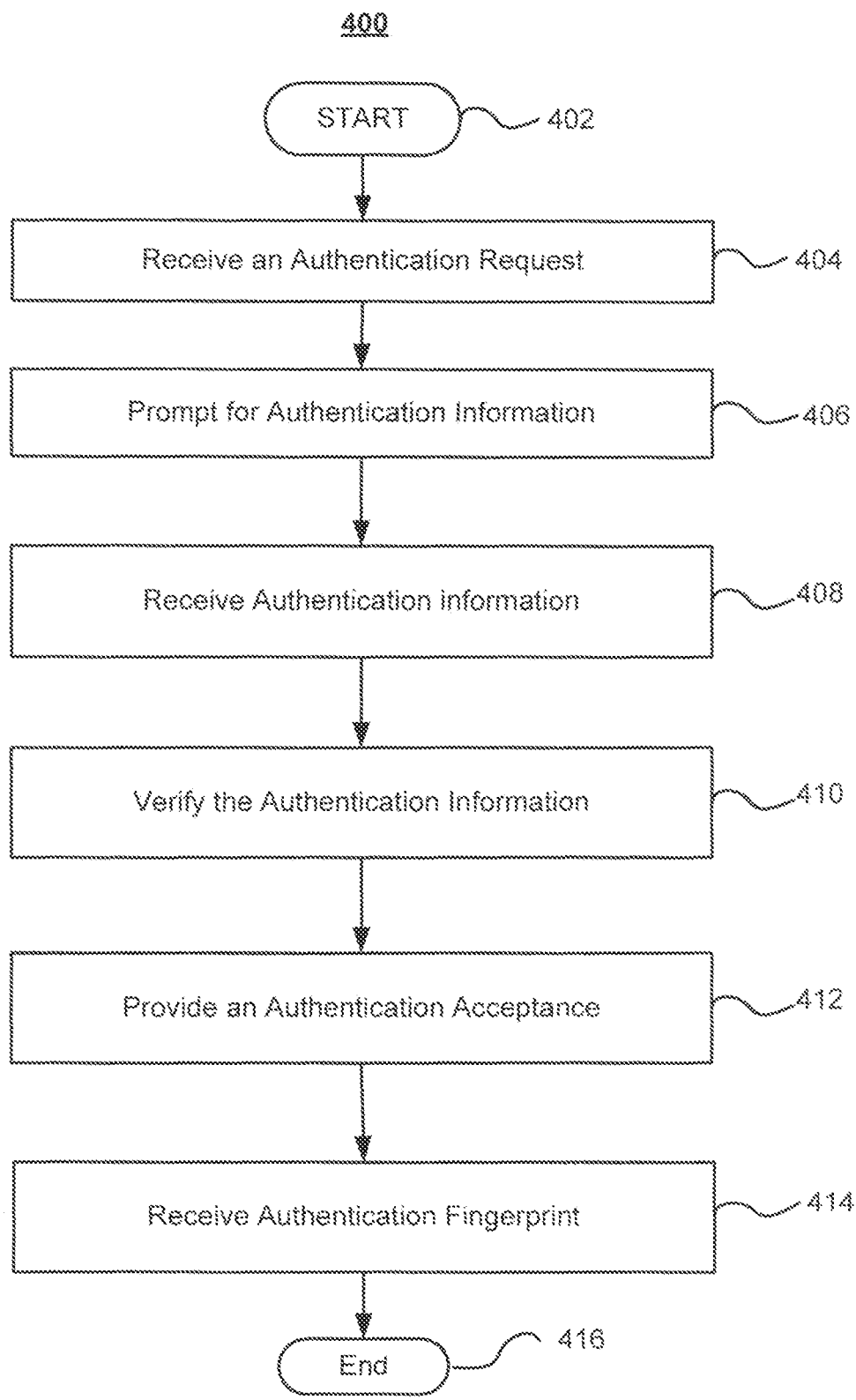
FIG. 4 is a flowchart illustrating the functionality for authenticating a media manager according to a particular embodiment.

FIG. 4 is a flowchart illustrating the functionality for authenticating a media manager according to a particular embodiment. This exemplary method 400 may be provided by way of example, as there are a variety of ways to carry out the method. The method 400 shown in FIG. 4 can be executed or otherwise performed by one or a combination of various systems. The method 400 is described below may be carried out by the system and network shown in FIGS. 1 and 2, by way of example, and various elements of the system and network are referenced in explaining the example method of FIG. 4. Each block shown in FIG. 4 represents one or more processes, methods or subroutines carried out in exemplary method 400. Referring to FIG. 4, exemplary method 400 may begin at block 402.

At block 402, the method 400 for authenticating media manager 102 may begin.

At block 404, the authentication or activation system 106 may receive an authentication request from the media manager 102 via the communication network 104. In an exemplary embodiment, the media manager 102 may be installed on a workstation associated with a user of the media manager 102. Upon activation of the media manager 102, the media manager 102 may provide an authentication request to the input/output (I/O) module 208 of the authentication or activation system 106. The media manager 102 may provide the authentication request to a default address associated with the input/output (I/O) module 208. The input/output (I/O) module 208 may receive the authentication request via a transport layer security (TLS) protocol or a secure sockets layer (SSL) protocol. After receiving an authentication request from the media manager 102, the method 400 may proceed to block 406.

At block 406, the authentication or activation system 106 may prompt authentication information from the media manager 102. For example, the presentation module 206 of the authentication or activation system 106 may provide a graphical user interface (GUI) to the media manager 102 for inputting authentication information. The graphical user interface (GUI) may allow the user of the media manager 102 to input requested authentication information by the authentication or activation system 106. For example, the presentation module 206 may prompt the user of the media manager 102 to input an authentication token via the graphical user interface (GUI). The authentication token may be provided to the user of the media manager 102 via telephone (e.g., interactive voice recognition system, customer service), text messages, emails, fax, or other forms of communication. The authentication token (e.g., a numerical stream) may be generated based at least in part on account information associated with service provided by a content provider to the user of the media manager 102. After prompting for authentication information from the media manager 102, the method 400 may proceed to block 408.

At block 408, the authentication or activation system 106 may receive authentication information from the media manager 102. For example, the user of the media manger 102 may input authentication information (e.g., authentication token) via the graphical user interface (GUI). The presentation module 206 may receive the authentication information and provide the received authentication information to various modules of the authentication or activation system 106. After receiving authentication information from the media manager 102, the method 400 may proceed to block 410.

At block 410, the authentication or activation system 106 may verify the authentication information provided by the media manager 102. For example, the processing module 210 may receive authentication token from the presentation module 206 and may verify whether the authentication token provided by the user of the media manager 102 matches an issued authentication token. In an exemplary embodiment, the processing module 210 may verify whether the authentication token received by the presentation module 206 matches an issued authentication token stored in the media manager module 214. The processing module 210 may determine that the authentication token provided by the user associated with the media manager 102 matches an issued authentication token stored in the media manager module 214. In another exemplary embodiment, the processing module 210 may determine that the authentication token provided by the user associated with the media manager 102 does not match an issued authentication token stored in the media manager module 214. The processing module 210 may request that the user associated with the media manager 102 to input another authentication token for a predetermined number of times (e.g., 3 times). After verifying the authentication information provided by the media manager 102, the method 400 may proceed to block 412.

At block 412, the authentication or activation system 106 may provide an authentication acceptance to the media manager 102. For example, after the processing module 210 verifies the authentication token provided by the user of the media manager 102, the processing module 210 may provide an authentication acceptance to the media manager 102. After providing an authentication acceptance to the media manager 102, the method 400 may proceed to block 414.

At block 414, the authentication or activation system 106 may receive authentication fingerprint of the media manager 102. For example, upon receiving authentication acceptance from the authentication or activation system 106, the media manager 102 may generate an authentication fingerprint and provide the authentication fingerprint to the input/output (I/O) module 208 of the authentication or activation system 106. For example, the authentication fingerprint may be generated based at least in part on the workstation of the media manager 102. For example, the authentication fingerprint may be generated based at least in part on an image, a microprocessor chip serial number, a media access control (MAC) address, operating system serial number, a seed, a unique randomized number, or a combination of unique features of the workstation of the media manager 102. Also, the authentication fingerprint may be generated based least in part on address information (e.g., IP address, uniform resource identifiers (URIs), uniform resource locators (URLs), private electronic mail addresses, physical address, telephone number, or other address information) of the workstation of the media manager 102.

The input/output (I/O) module 208 may provide the authentication fingerprint to the media manager module 214 and stored. The media manager module 214 may store the authentication fingerprint in order to track a number of authentication fingerprints associated with the user of the media manager 102. After receiving authentication fingerprint from the media manager 102, the method 400 may proceed to block 416.

At block 416, the method 400 for authenticating media manager 102 may end.

Figure 5:
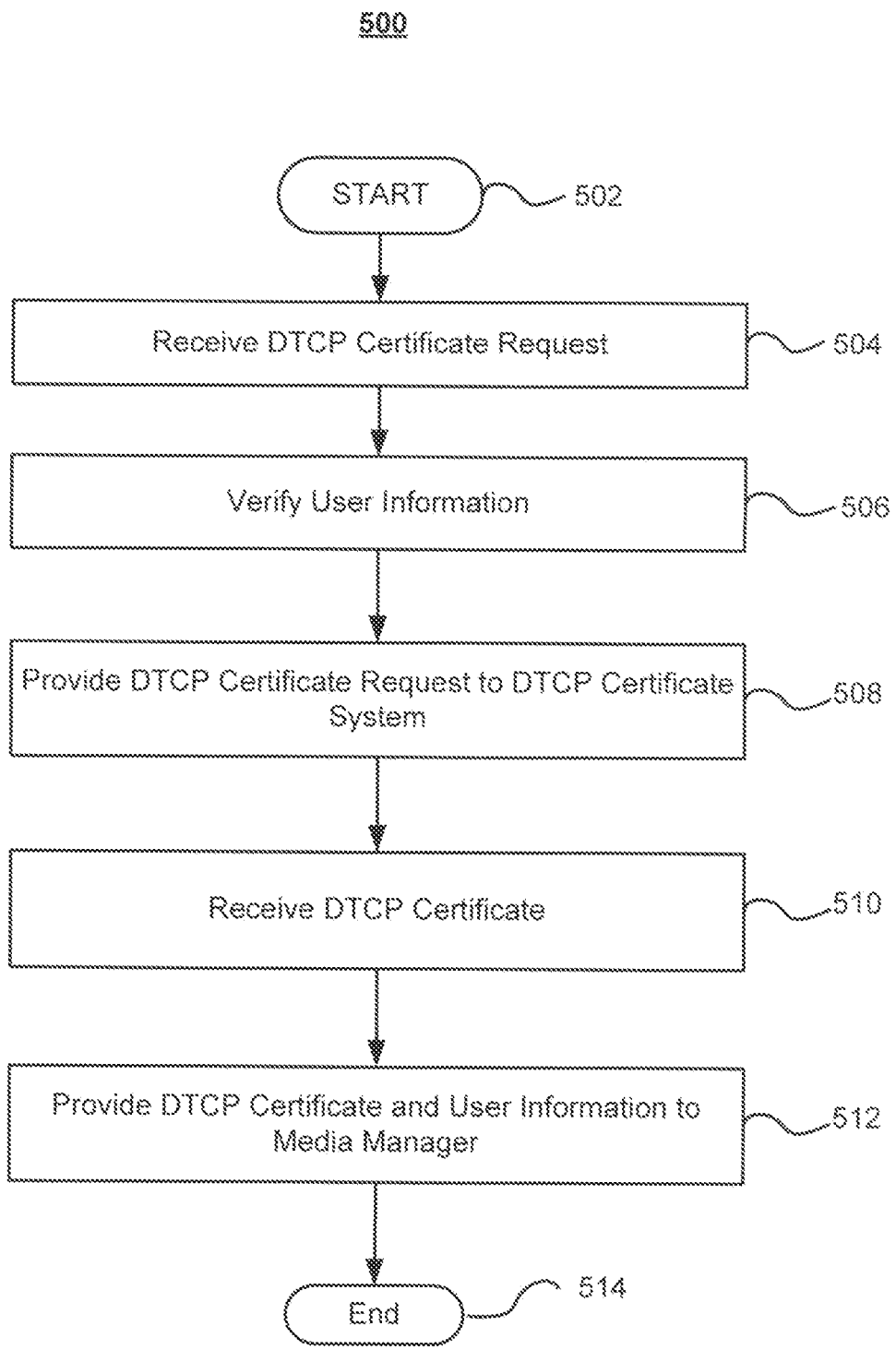
FIG. 5 is a flowchart illustrating the functionality for obtaining DTCP certificates according to a particular embodiment.

FIG. 5 is a flowchart illustrating the functionality for obtaining DTCP certificates according to a particular embodiment. This exemplary method 500 may be provided by way of example, as there are a variety of ways to carry out the method. The method 500 shown in FIG. 5 can be executed or otherwise performed by One or a combination of various systems. The method 500 is described below may be carried out by the system and network shown in FIGS. 1 and 2, by way of example, and various elements of the system and network are referenced in explaining the example method of FIG. 5. Each block shown in FIG. 5 represents one or more processes, methods or subroutines carried out in exemplary method 500. Referring to FIG. 5, exemplary method 500 may begin at block 502.

At block 502, the method 500 for obtaining DTCP certificates may begin.

At block 504, the authentication or activation system 106 may request a DTCP request from the media manager 102. For example, the media manager 102 may provide a request for DTCP certificate to the authentication or activation system 106. The request for DTCP certificate may include the authentication fingerprint of the workstation 110 hosting the media manager 102. The input/output module 208 may receive the request for DTCP certificate from the media manager 102 via a transport layer security (TLS) protocol or secure sockets layer (SSL) protocol. After receiving a DTCP request from the media manager 102, the method 500 may proceed to block 506.

At block 506, the authentication or activation system 106 may verify user information of the user of the media manager 102. For example, the processing module 210 may retrieve user information associated with the user of the media manager 102 based at least in part on the request for the DTCP certificate from the database module 212. For example, the user information associated with the user of the media manager 102 may include may include, name, address, account number, telephone number, email address, billing information, a set-top boxes (STB) (e.g., a serial number or an identification number), a digital video recorder (DVR) (e.g., serial number or an identification number), a consumer electronic device (CE) (e.g., serial number or an identification number), cable modem, router, or other equipments associated with the user of the media manager 102.

The processing module 210 may determine whether the user qualifies for the DTCP certificate based at least in part on the user information associated with the user of the media manager 102. In an exemplary embodiment, the processing module 210 may determine that the user of the media manager 102 has a digital video recorder (DVR) and may need a DTCP certificate in order to access various contents stored in the digital video recorder (DVR). In another exemplary embodiment, the processing module 210 may determine that the user of the media manager 102 does not have a digital video recorder (DVR) and may not need a DTCP certificate to access contents stored in the digital video recorder (DVR). After verifying user information of the user of the media manager 102, the method 500 may proceed to block 508.

At block 508, the authentication or activation system 106 may provide a DTCP certificate request to the DTCP certificate system 108. The input/output (I/O) module 208 may provide the DTCP certificate request received from the media manager 102 to the DTCP certificate system 108. In an exemplary embodiment, the DTCP certificate system 108 may be associated with a content provider. In another exemplary embodiment, the DTCP certificate system 108 may be associated with a third party DTCP certificate provider (e.g., Digital Transmission Licensing Administrator (DTLA)). After providing DTCP certificate request to the DTCP certificate system 108, the method 500 may proceed to block 510.

At block 510, the authentication or activation system 106 may receive the DTCP certificate. For example, upon receiving the DTCP certificate request, the DTCP certificate system 108 may generate a DTCP certificate based at least in part on the DTCP certificate request. The DTCP certificate system 108 may provide the DTCP certificate to the input/output (I/O) module 208 of the authentication or activation system 106. The input/output (I/O) module 208 may provide the DTCP certificate to the DTCP certificate module 216 and stored. After receiving the DTCP certificate, the method 500 may proceed to block 512.

At block 512, the authentication or activation system 106 may provide the DTCP certificate and user information to the media manager 102. For example, the input/output (I/O) module 208 may provide the DTCP certificate to the media manager 102. The input/output (I/O) module 208 may access the database module 212 to provide user information associated with user of the media manager 102 to the media manager 102 along with the DTCP certificate. For example, the input/output (I/O) module 208 may access the database module 212 to provide set-top boxes (STB) information (e.g., a serial number or an identification number), a digital video recorder (DVR) information (e.g., serial number or an identification number), or a consumer electronic device (CE) information (e.g., serial number or an identification number) to the media manager 102 along with the DTCP certificate. The input/output (I/O) module 208 may encrypt the DTCP certificate and the user information associated with the user of the media manager 102 in order to prevent tempering or unauthorized access of the DTCP certificate and the user information associated with the user of the media manager 102. After providing the DTCP certificate and the user information to the media manger 102, the method 500 may proceed to block 514.

At block 514, the method 500 for obtaining DTCP certificates may end.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:

1. A method, comprising:
 verifying authentication information provided by a user of a content provider;
 receiving, based on the verification, an authentication fingerprint of a workstation associated with the user of the content provider;
 receiving, electronically, a request for a digital transmission content protection certificate from the user of the content provider, the digital transmission content protection certificate permitting access to content stored on a content provider device comprising one of a set-top box (STB), a digital video recorder (DVR), and a consumer electronic device (CE), wherein the request comprises the authentication fingerprint and an identifier associated with the content provider device;

retrieving, based at least in part on the authentication fingerprint of the request, a stored identifier associated with the content provider device of the user;

verifying, by at least one computer processor, based at least in part on the request, user information associated with the user of the content provider, wherein verifying the user information comprises determining whether the user of the content provider qualifies for the digital transmission content protection certificate based at least in part on the user needing to access content stored on the content provider device and having a matching received identifier to the retrieved identifier;

providing, electronically, the request for the digital transmission content protection certificate to a digital transmission content protection certificate system upon determining that the user qualifies for the digital transmission content protection certificate; and receiving, electronically, the digital transmission content protection certificate from the digital transmission content protection certificate system based upon the request.

2. The method according to claim 1, wherein the digital transmission content protection certificate is transmitted via at least one of a transport layer security (TLS) protocol or a secure sockets layer (SSL) protocol.

3. The method according to claim 1, wherein the digital transmission content protection certificate includes the authentication fingerprint of a workstation associated with the user of the content provider.

4. The method according to claim 3, wherein the authentication fingerprint is generated based at least in part on a unique feature of the workstation associated with the user of the content provider.

5. The method according to claim 1, wherein the user information includes at least one of name of the user, physical address of the user, account number of the user, telephone number of the user, email address of the user, billing information of the user, set-top box (STB) information of the user, digital video recorder (DVR) information of the user, and consumer electronic device (CE) information of the user.

6. A non-transitory computer readable medium storing an executable program comprising instructions to perform the method of claim 1.

7. The method according to claim 1, further comprising:
receiving, electronically, an authentication request from the user of the content provider;
receiving, electronically, the authentication information provided by the user of the content provider; and
providing, electronically, an authentication acceptance to the user of the content provider.

8. The method according to claim 7, wherein the authentication information is issued by the content provider.

9. The method according to claim 8, wherein verifying the authentication information comprises determining whether the authentication information provided by the user of the content provider matches the authentication information issued by the content provider.

10. The method according to claim 7, wherein the authentication fingerprint of the workstation comprises at least one unique feature of the workstation, wherein the at least one unique feature comprises an image, a serial number, a media access control address, a unique randomized number, or any combination thereof.

11. The method according to claim 10, wherein the at least one unique feature of the workstation is selectable from among a microprocessor chip serial number, a media access control address of the workstation, and a serial number of an operating system of the workstation.

12. The method according to claim 1, wherein the request from user is transmitted from a media manager and is received by an authentication or activation system.

13. The method according to claim 1, further comprising:
transmitting the digital transmission content protection certificate, following the receiving thereof, along with at least a portion of the user information, to a media manager.

14. The method according to claim 13, further comprising:
encrypting the digital transmission content protection certificate prior to the transmitting thereof.

15. The method of claim 1, further comprising:
storing the digital transmission content protection certificate following the receiving thereof.

16. A non-transitory computer readable medium storing an executable program comprising instructions to perform the method of claim 7.

17. A system, comprising:
one or more processors; and
at least one memory comprising computer-readable instructions which when executed by the one or more processors cause the one or more processors to perform the steps comprising:
verifying authentication information provided by a user of a content provider;
receiving, based on the verification, an authentication fingerprint of a workstation associated with the user of the content provider;
receiving a request for a digital transmission content protection certificate from the user of the content provider, the digital transmission content protection certificate permitting access to content stored on a content provider device comprising one of a set-top box (STB), a digital video recorder (DVR), and a consumer electronic device (CE), wherein the request comprises the authentication fingerprint and an identifier associated with the content provider device;
retrieving, based at least in part on the authentication fingerprint of the request, a stored identifier associated with the content provider device of the user;
verifying, based at least in part on the request, user information associated with the user of the content provider wherein verifying the user information comprises determining whether the user of the content provider qualifies for the digital transmission content protection certificate based at least in part on the user needing to access content stored on the content provider device having a matching received identifier to the retrieved identifier;
providing the request for the digital transmission content protection certificate to a digital transmission content protection certificate system upon determining that the user qualifies for the digital transmission content protection certificate; and
receiving the digital transmission content protection certificate from the digital transmission content protection certificate system based upon the request.

18. The system according to claim 17, further comprising a database configured to store the user information associated with the user of the content provider.

19. The system according to claim 17, wherein the user information includes at least one of name of the user, physical address of the user, account number of the user, telephone number of the user, email address of the user, billing information of the user, set-top box (STB) information of the user, digital video recorder (DVR) information of the user, and consumer electronic device (CE) information of the user.

20. The system according to claim 17, further comprising a media manager configured to store authentication information provided to the user of the content provider.

21. The system according to claim 17, further comprising DTCP certificate storage for storing the digital transmission content protection certificate.

22. The system according to claim 17, wherein the steps performed by the processor further comprise:
   receiving an authentication request from the user of the content provider;
   receiving the authentication information provided by the user of the content provider; and
   providing an authentication acceptance to the user of the content provider.

\* \* \* \* \*